March 15, 1960  A. B. ROGERS ET AL  2,928,748
PREPARATION OF FROZEN STUFFED FOWL
Filed April 19, 1956  2 Sheets-Sheet 2
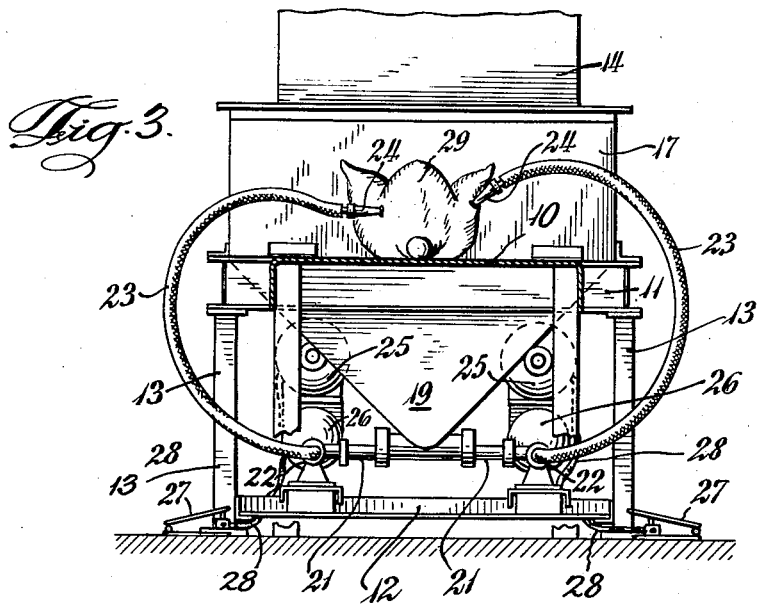
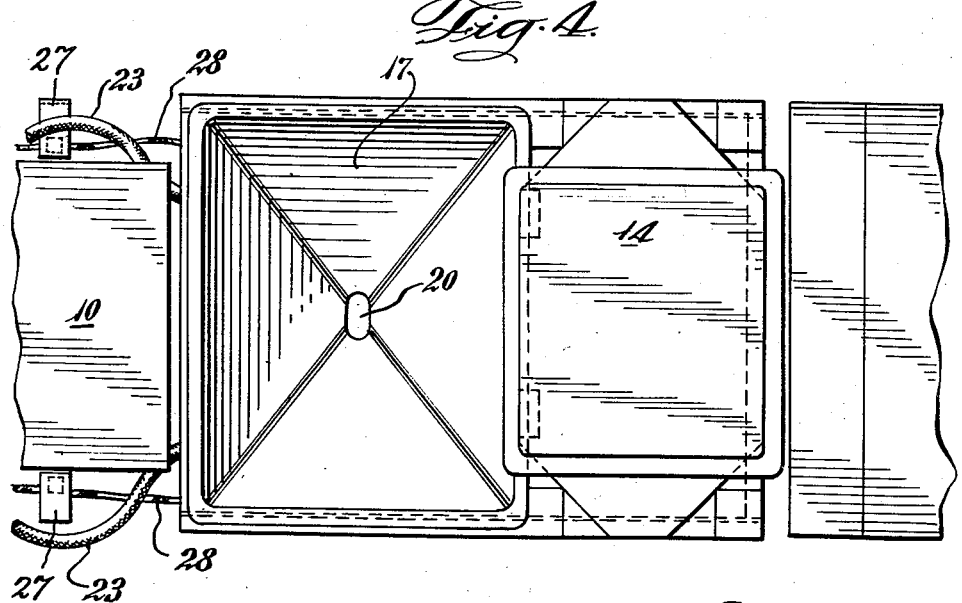

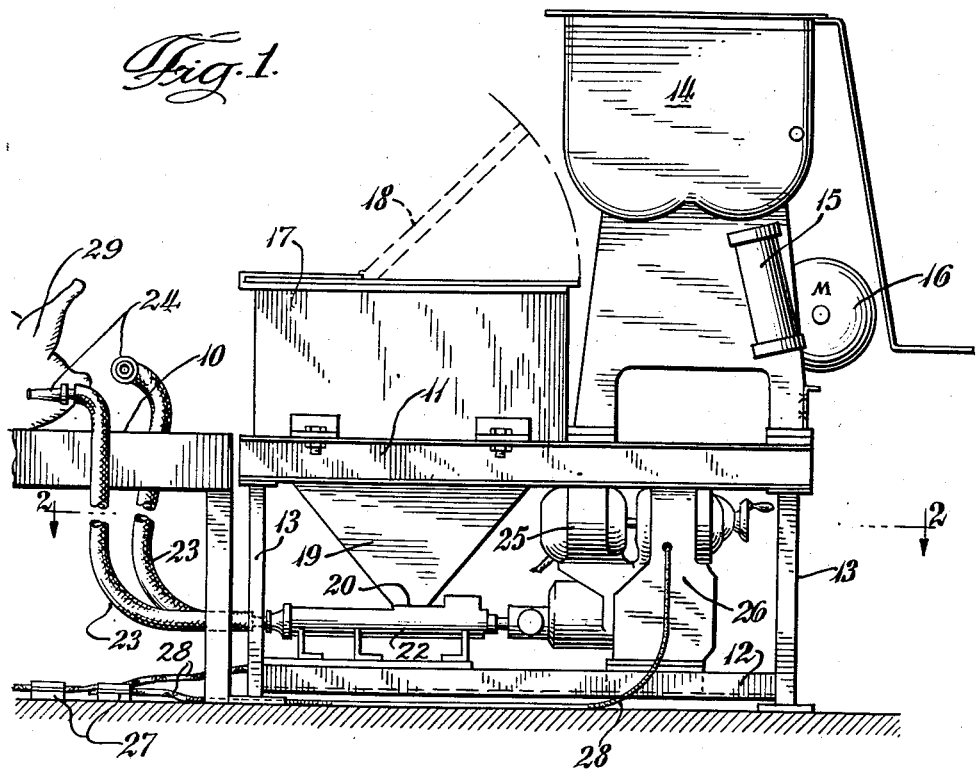
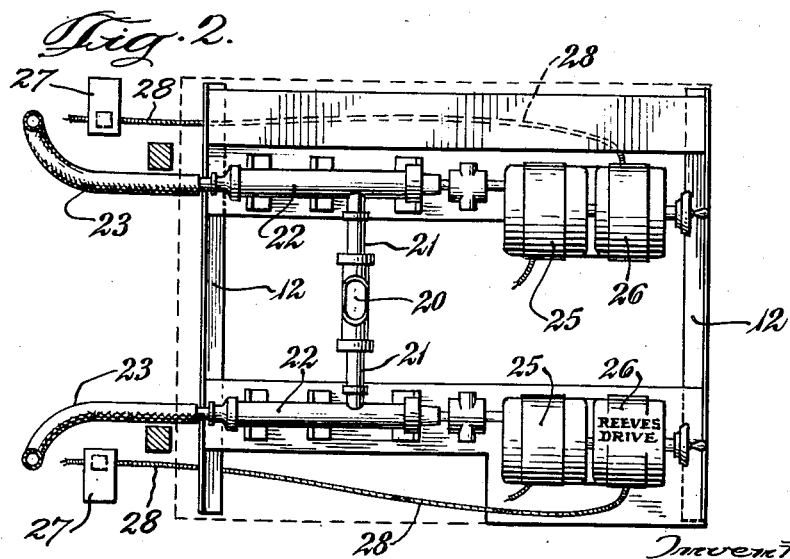

United States Patent Office 2,928,748
Patented Mar. 15, 1960

2,928,748

PREPARATION OF FROZEN STUFFED FOWL

Alan Barde Rogers, Palos Park, and Ralph W. Kline, Oak Lawn, Ill., assignors to Armour and Company, Chicago, Ill., a corporation of Illinois Application April 19, 1956, Serial No. 579,327

1 Claim. (Cl. 99—194)

This invention relates to an improved process and novel apparatus for the preparation of frozen stuffed fowl.

While it is understood that the present invention is applicable to the treatment of any kind of fowl susceptible to stuffing, for the purposes of the present specification the invention will be described as applied to the stuffing of turkey.

One of the difficult and time-consuming tasks performed by housewives and cooks in the preparation of roast turkey is the actual stuffing of the turkey prior to placing in the oven. This procedure involves mixing the bread stuffing ingredients beforehand, allowing the turkey (if it is frozen) to thaw sufficiently to permit access to the body cavities, and then stuffing the turkey, sewing and trussing, and finally placing the bird in the oven.

It has heretofore been recognized that, if poultry processors could market an already stuffed, frozen turkey, which could be taken directly from the freezer and placed in the oven, thus eliminating the need on the part of the cook or housewife for the difficult thawing, stuffing, sewing, and trussing steps, such product would have considerable sales appeal. However, bread stuffing such as used in turkeys provides an excellent medium for the growth of microorganisms, including those associated with food poisoning outbreaks, and heretofore the danger of microbial food poisoning has presented a major obstacle to the marketing of pre-stuffed turkeys. Although it is possible to start out a commercial turkey stuffing operation with a dried bread stuffing which, because of the heat involved in the drying operation, has been rendered substantially free of vegetative living bacteria, nevertheless if such stuffing should be inoculated with bacteria during the stuffing operation and if the inoculated stuffing, prior to consumption, should be subjected to conditions of temperature and time favorable to the growth of bacteria, the possibility of food poisoning is a serious one.

In a turkey stuffing operation, the stuffing mixture can be inoculated with bacteria from several different sources. Organisms such as Salmonella and food poisoning Staphylococci are present on the hands of the operators and also cannot be completely eliminated from the skin and body cavity surfaces of the turkeys themselves. Therefore, if the stuffing mixture should come in contact with the hands of the operators or with the surfaces of the turkey which is being stuffed, and if that portion of the stuffing which has thus been contacted with bacteria-bearing surfaces should subsequently undergo conditions of time and temperature favoring the growth of the bacteria, there is a substantial possibility of the development of sufficient bacteria counts to cause food poisoning.

It is known that cooking temperatures are generally sufficient to destroy bacteria of the type under consideration here. It is also known that freezing does not destroy all the bacteria present in the poultry but does in most cases prevent their further growth. Therefore, if turkeys can be frozen immediately following the stuffing operation and can subsequently be thawed and immediately cooked at such temperatures as to destroy all the bacteria present, the food poisoning problem would be negligible. However, the tendency of housewives and cooks to under-cook turkey, and the difficulty in guarding against such thing, presents a major problem. In a roasting operation, the temperatures attained at and near the outside surfaces of the bird are usually sufficient to destroy any microorganisms present there, but in many cases the inside temperatures, especially those on the interior of the stuffing mass located in the interior body cavity, never attain temperatures sufficiently high to kill bacteria. Thus, if the interior of the stuffing mass has been inoculated with bacteria and contains a relatively high count in the beginning, and if during the roasting process this portion of the stuffed bird is subjected to warm but not bacteria-destroying temperatures for a considerable length of time, conditions have been supplied for an increase of the bacteria count far above the permissive limit. In a turkey stuffing operation, therefore, a major objective to be kept in mind is the maintenance of a quickly moving, sanitary process which is effective in maintaining the bacteria counts at very low levels, especially in those interior portions of the stuffing which might fail to attain bacteria-destroying temperatures during cooking.

It is an object of the present invention to provide a poultry-stuffing process and apparatus fulfilling the above requirements. More specifically, it is an object of the invention to provide a continuous process which because of its accelerated rate of production is highly desirable from the standpoint of both economics and prevention of bacterial growth. A further object of the invention is to provide means for starting with substantially sterile supplies of bread stuffing, means for keeping the introduction of bacteria to a minimum during the stuffing operation, and means for avoiding conditions promoting or favoring the growth of any bacteria which might exist. Additional objects and advantages of the invention will become apparent as the specification proceeds.

According to the present invention, we have devised a continuous process for the preparation of frozen stuffed fowl which comprises (A) dressing said fowl according to conventional procedures and advancing the dressed fowl along a conveyor line to a stuffing station; (B) preparing a mixture from substantially dry bread stuffing mix, edible oil, water, and ice and pumping said mixture through a line terminating in a nozzle at said stuffing station; (C) introducing said pumped stuffing mixture into a body cavity of the dressed fowl at said stuffing station; and (D) subsequently trussing and freezing the stuffed fowl.

One form of the improved apparatus suitable for carrying out the process of this invention is illustrated in the accompanying drawings, in which:

Fig. 1 is a side view in elevation showing a stuffing apparatus embodying the invention; Fig. 2 is a top plan detail sectional view, the section being taken at line 2 of Fig. 1; Fig. 3 is an end view in elevation of the same apparatus; and Fig. 4 is a top plan of the entire apparatus.

The apparatus contemplated by the present invention comprises the combination of a hopper tank, said tank being adapted to hold pumpable stuffing material and having a tapered bottom; a stuffing station adjacent said hopper tank; conduit means leading from the tapered bottom of said hopper tank and terminating in a nozzle at said stuffing station; pressure-actuated controls located adjacent said stuffing station; a progressing cavity pump interposed in said conduit between hopper and stuffing station; and means responsive to said pressure-actuated controls for starting and stopping the operation of said pump.

Referring in detail to the drawings, fowl such as turkeys are dressed according to conventional procedures and advanced along a conveyor line (not shown) to a stuffing station 10. In a conventional dressing procedure carried out before the turkeys reach the stuffing station, the birds are first killed and then scalded, picked, cleaned, singed, washed, and passed on to the evisceration stage where the viscera are removed, the feet and neck cut off, the giblets removed and washed, the carcass washed inside and out, the tail tied with string, the tail bone cut, the hocks and tail trussed together, the bird placed in ice slush cooling tanks and chilled for 12 hours or more to develop tenderness, drained on drain lines, and then passed on conveyors to the stuffing station 10.

In the embodiment shown in the drawings, the stuffing apparatus adjacent stuffing station 10 includes a frame made up of platforms 11 and 12 supported by standards 13. Mounted on the frame is a mixing tank 14 which is equipped with agitator mechanism 15 driven by motor 16. The mixing tank is hinged so that its contents can be dumped into hopper tank 17 which is also mounted on the frame. Hopper 17 is preferably fitted with a hinged cover 18 and a tapered bottom 19 which terminates in a centrally located outlet opening 20.

Communicating with the outlet opening 20 are conduits 21 which lead to a pair of pumps 22, which are also mounted on said frame. In the preferred embodiment of this invention, these pumps are of the progressing cavity type generally referred to in the art as Moyno pumps. It has been found that this type of pump is especially suitable for use in the present invention, since it is capable of maintaining a constant and extremely rapid output without undue comminuting or hashing of the stuffing mixture which is being pumped. The purpose of pump 22 in the present apparatus is to withdraw stuffing mixture from the bottom of hopper tank 17 and pump it through lines 23 to nozzles 24 located at the stuffing station 10.

The pumps 22 are driven by motors 25 through variable speed drives and clutches designated generally by the numeral 26 in the drawings. The drives and clutches 26 are responsive to pressure actuated controls 27 located adjacent the stuffing station 10. Such controls preferably take the form of a foot pedal switch on the floor at station 10, which switch communicates by means of an electric cable 28 with one of said drives and clutches 26. The pumping mechanism therefore operates on the principle of continuously running motors 25 which drive pumps 22 only when clutches 26 are engaged by actuation of foot pedal switches 27.

It will be understood that any suitable material may be used in the construction of the tanks, conduits, nozzles, etc., involved in the present apparatus. In practice, it has been found preferable to employ stainless steel tanks and nozzles. Use of a flexible plastic material for the conduit lines 23 has some advantages, although in some cases the expansion and contraction of such types of lines cause a stuffing-drip problem which must be overcome. It has been found feasible for most operations to use fixed, inflexible lines for the conduits 23.

In carrying out the process of this invention, according to the embodiment shown in the drawings, the bread stuffing ingredients are first introduced into the mixing tank 14. These ingredients preferably comprise dry bread stuffing mix, edible oil, moisture, and salt. The dry bread stuffing mix includes the usual ingredients such as bread, celery, onions, and spice, and may either be prepared by starting with such ingredients and going through the drying operation or by purchasing it as a commercially prepared stuffing of the type offered by several large baking companies. From the standpoint of repressing bacterial growth during the stuffing operation, it is preferable that the stuffing mixture which is pumped through the system be maintained at a temperature near the freezing point, and for this purpose it has been found advisable to include ice as a part of the moisture in the mixing tank. As a specific example of a suitable dressing mixture, the following may be given:

100 lbs. dry bread mix (containing bread, spices, celery, and onions)
42 lbs. peanut oil
60 lbs. chipped ice
92 lbs. cold water
1 lb. salt It will be understood of course that the above ingredients and preparations may be varied according to variations in taste, economics, and atmospheric conditions, without departing from the spirit of the present invention. Generally, the oil content should be from about 10% to about 20% of the entire mixture, on a weight basis, and the total moisture (ice plus water) should be from about 45% to about 60%. The suitable proportions of water and ice making up the total moisture content will vary depending upon the temperature of the water, the bread stuffing, and the atmosphere in the work room, but ordinarily the water-ice range should be from about 3 parts of ice for each part of water to about 1 part of ice for each 3 parts of water.

In one embodiment of the invention, which has been designed to meet the problem of maintaining the stuffing mixture at a low temperature near the freezing point but at the same time providing a mixture which is fluid enough to be pumped through conduit lines and nozzles, we introduce the stuffing ingredients into the mixing tank 14 in a specific sequence. Thus, it has been found preferable to mix the dry stuffing and edible oil first, before any substantial quantity of moisture is added. For example, a suitable sequence of steps involves first adding the dry bread mix, then the edible oil, then the ice in sufficient quantity to bring the temperature down to about 32° F., then the water, and finally the salt. It has been found that in the initial mixing of the dry bread mix and the edible oil, the bread is coated to some degree with the oil, and this prevents the bread from immediately and completely absorbing the water which is later introduced. If the bread mix were not preliminarily coated with the oil, all the moisture would be quickly absorbed by the bread and no moisture would be available for providing fluidity to the cold mixture, which of course would be a serious deficiency where it is desired to maintain the mixture in a fluid, pumpable condition. As time passes during the subsequent holding period, prior to the time the stuffing is actually deposited inside the turkey, there is a gradual absorption of water into the oil coated bread. However, there is also a concomitant melting of the chipped ice ingredient during this period, and this serves to replace the moisture which is needed for fluidity of the mass. Thus, although there is gradual loss of fluid moisture because of absorption, this loss is compensated for by the melting of the ice and the consequent metering of water into the mixture. As a result of the use of ice as an ingredient, and further as a result of the specific sequence of steps involving the addition of edible oil before the moisture, we are able to provide a stuffing mixture having a desirably low temperature as well as sufficient fluidity to be pumpable over periods as long as 45 to 60 minutes from the time the ingredients are first mixed. It has been found possible, by the above method, to add sufficient ice to bring the temperature of the mixture down as low as 28° F. and still retain the pumpable characteristic of the mixture.

The ingredients which have been added to tank 14 are mixed for a period of time by means of agitator device 15. Following the mixing period, which takes a matter of 2 or 3 minutes, the cover 18 of hopper tank 17 is raised, and the contents of mixing tank 14 are dumped into hopper 17, where the stuffing mixture is then available for use in the stuffing procedure.

In the actual stuffing procedure, one or more operators take their positions at station 10 and as each turkey 29 arrives at said station on the overhead conveyor (not shown) it is removed from the conveyor and placed on the table. The operator then inserts one of the nozzles 24 into the body cavity and steps on foot switch 27. This engages one of the clutch mechanisms 26, which causes one of the pumps 22 to withdraw stuffing material from the hopper tank 17 and pump it through line 23 and out nozzle 24 into the body cavity which is being stuffed. When the cavity is filled, the operator takes his foot off switch pedal 27, thus disengaging the clutch and interrupting the flow of stuffing out of nozzle 24. It will be noted that the apparatus shown in the drawings provides two separate lines, nozzles, and foot switches at station 10, thus allowing two operators to carry on a stuffing operation at that point at the same time.

A feature of the present invention is the fact that the entire procedure of mixing the ingredients, transferring the mixture to the hopper, and pumping into the body cavity, can be carried out without contaminating or inoculating the stuffing mixture by reason of contacting said mixture with the hands of the operator. Moreover, the stuffing is deposited in the body cavity in such a way that the stuffing which is found in the center of the stuffing mass has not come in contact with either the hands of the operator or the skin or other bacteria-bearing surfaces of the turkey itself. In the stuffing operation, the nozzle is inserted into the body cavity, and, as the pump is started in operation, a layer of stuffing is first deposited on the bottom surface of the cavity and then further layers build up until, when the cavity has been filled, the nozzle can be withdrawn. In this mode of operation, the interior portion of the stuffing has not come in contact with the turkey itself or with the hands of the operator, and therefore there are little or no bacteria in that portion of the stuffing which might possibly fail to reach bacteria-destroying temperatures during the cooking operation. A major source of trouble from bacterial contamination has thus been eliminated.

Following the stuffing operation, the stuffed turkeys are immediately trussed, bagged, and frozen according to conventional procedures. Thus, as a specific example, following the stuffing step, the giblet package is added, the turkey is trussed, then bagged, and finally placed on a pallet and sent to the freezing room.

By the use of turkeys which have just been taken from the slush ice cooling tanks, and by the use of a pumpable stuffing mixture which itself has a temperature close to the freezing point (28 to 40° F.), and further by reason of the rapidity with which the stuffing operation can be carried out with the apparatus of the present invention, it is a feature of this invention that the entire procedure can be carried out without the temperatures of the turkeys or the stuffing rising above 45 or 50° F.

Further, by maintaining low temperatures as indicated above, and by starting the procedure with a pumpable stuffing mixture which is substantially free of vegetative living bacteria, and by use of stuffing apparatus such as shown in the drawings, which apparatus enables the operator to avoid introducing bacteria into the stuffing mixture during the stuffing operation, the application of the present invention permits the marketing of frozen stuffed turkeys which are safe from a bacterial standpoint. Whereas it has been recommended that frozen food manufacturers set standards for total bacterial counts of 100,000 or less per gram for the frozen foods which they market (G. A. Fitzgerald, American Journal of Public Health, 37, 695, 1947), the practice of the present invention enables the marketing of turkeys having total counts averaging no more than 12,000 or 15,000 per gram in the center of the stuffing.

The example illustrates a specific application of the invention:

EXAMPLE

Using apparatus of the type shown in the drawings, turkeys were stuffed over a 3-day period at a rate of 450 turkeys per hour. During this time, samples of stuffing were taken at intervals from three different points, namely: (a) from the hopper 17; (b) from the nozzle 24; and (c) from the interior of the stuffing mass in the body cavity of turkeys passing to the freezing room. Samples of stuffing thus taken were studied to determine: (1) total bacteria count; (2) Salmonella; and (3) food poisoning Staphylococci.

*Testing procedure*

(1) For total counts, 11 gms. of each sample were blended in a sterile Waring Blendor with 99 ml. water blank for three minutes and suitable aliquots were plated with plate count agar for total counts and incubated at 30° C. for 48 hours.

(2) Salmonellae were run in dilution bottles containing 90 ml. of Selenite F broth incubated at 37° C. for 20 hours. After incubation the broth was streaked on Brilliant Green agar plates and plates incubated at 37° C. for 20 hours. Typical light pink colonies from the Brilliant Green plates were examined for agglutination in polyvalent antiserum.

(3) Food poisoning Staphylococci were run on Phenol Red mannitol agar. After the plates were incubated at 37° C. for 48 hours colony counts were made. Eight colonies of suspected Staphylococci were then fished for each sample and examined microscopically. Isolated gram positive cocci were streaked on tellurite glycine agar plates.

*Results*

All samples tested were negative for Salmonellae and food poisoning Staphylococci. Total bacteria counts are given below in Table I:

TABLE I

| Day | Sample No. | Total Bacteria Counts | | |
|---|---|---|---|---|
| | | Hopper | Nozzle | Body Cavity |
| 1 | 1 | 8,300 | 6,700 | 11,900 |
| | 2 | 13,000 | 5,000 | 9,100 |
| | 3 | 8,700 | 5,000 | 23,000 |
| | 4 | 9,100 | 4,200 | 11,000 |
| | 5 | 6,800 | 6,600 | 10,000 |
| 2 | 1 | 9,200 | 11,500 | 8,600 |
| | 2 | 5,700 | 8,500 | 8,700 |
| | 3 | 4,900 | 6,600 | 6,700 |
| | 4 | 8,500 | 5,100 | 10,200 |
| | 5 | 5,000 | 5,200 | 7,900 |
| 3 | 1 | 12,600 | 8,600 | 10,300 |
| | 2 | 9,800 | 14,700 | 10,800 |
| | 3 | 6,500 | 9,000 | 7,600 |
| | 4 | 10,100 | 13,800 | 16,500 |
| | 5 | 12,700 | 11,300 | 13,300 |

While in the foregoing specification various embodiments of this invention have been set forth and specific details thereof elaborated for purposes of illustration, it will be apparent to those skilled in the art that this invention is susceptible to other embodiments and that many of the details may be varied widely without departing from the basic concept and spirit of the invention.

We claim:

A continuous process for the preparation of frozen stuffed fowl which comprises (A) dressing said fowl according to conventional procedures and advancing the dressed fowl to a stuffing station; (B) preparing a pumpable mixture of bread stuffing by mixing substantially dry bread stuffing mix with edible oil and then adding water and ice, said mixture after mixing having a temperature of about 28° to 40° F.; (C) pumping said mixture into a body cavity of the dressed fowl at said stuffing station; and (D) subsequently placing the stuffed fowl in a quick-freezing atmosphere before the central interior of the stuffing mass located in the rear cavity of said stuffed fowl reaches a temperature above 50° F.

References Cited in the file of this patent
UNITED STATES PATENTS

| | | |
|---|---|---|
| 2,350,935 | Sipe | June 6, 1944 |
| 2,427,202 | Dyrek et al. | Sept. 9, 1947 |
| 2,481,484 | Noyes | Sept. 13, 1949 |
| 2,623,825 | Tressler et al. | Dec. 30, 1952 |
| 2,690,589 | Moses | Oct. 5, 1954 |
| 2,709,658 | Buchanan | May 31, 1955 |

OTHER REFERENCES

"Everybody's Cook Book," 1924, by I. E. Lord, published by Henry Holt and Co., New York, pp. 384 and 385.

"The New Settlement Cook Book," 1954, by S. Kander, published by Simon and Shuster, New York, pp. 207, 208 and 209.

"Quick Frozen Foods," January 1955, pp. 114 and 115, article entitled "Stuffed Poultry Pack Chalks Up Fivefold Increase in 5 Years."